(12) United States Patent
Tsukada et al.

(10) Patent No.: US 7,779,203 B2
(45) Date of Patent: Aug. 17, 2010

(54) RAID BLOCKING DETERMINING METHOD, RAID APPARATUS, CONTROLLER MODULE, AND RECORDING MEDIUM

(75) Inventors: Koichi Tsukada, Kawasaki (JP); Satoshi Yazawa, Kawasaki (JP); Shoji Oshima, Kawasaki (JP); Tatsuhiko Machida, Kawasaki (JP); Hirokazu Matsubayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 992 days.

(21) Appl. No.: 11/537,230

(22) Filed: Sep. 29, 2006

(65) Prior Publication Data
US 2008/0010495 A1 Jan. 10, 2008

(30) Foreign Application Priority Data
May 9, 2006 (JP) .............................. 2006-130737

(51) Int. Cl.
*G06F 12/00* (2006.01)
(52) U.S. Cl. .................................. 711/114; 714/5; 714/6
(58) Field of Classification Search ........................ None
See application file for complete search history.

(56) References Cited

FOREIGN PATENT DOCUMENTS

| JP | 04-291649 | 10/1992 |
|----|-----------|---------|
| JP | 2000-132413 | 5/2000 |
| JP | 2000-215086 | 8/2000 |
| JP | 2002-373059 | 12/2002 |

OTHER PUBLICATIONS

Office Action issued in corresponding Japanese Patent Application No. 2006-130737; mailed on May 7, 2008.

*Primary Examiner*—Kevin Verbrugge
(74) *Attorney, Agent, or Firm*—Staas & Halsey LLP

(57) ABSTRACT

For each RAID group to be determined for blocking, each disk is classified into three types of totalization unit based on the status of each disk belonging to the RAID group or the presence/absence of an access path to each disk, and the number of disks corresponding to each totalization unit is totalized. The totalization unit is a "used disk", an "unused disk", and a "loop-down disk". The totalization result is compared with the threshold condition set for each RAID level (for example, "unused disk"=0 and "loop-down disk"='1 or more'), and the blocking possibility is determined.

12 Claims, 15 Drawing Sheets

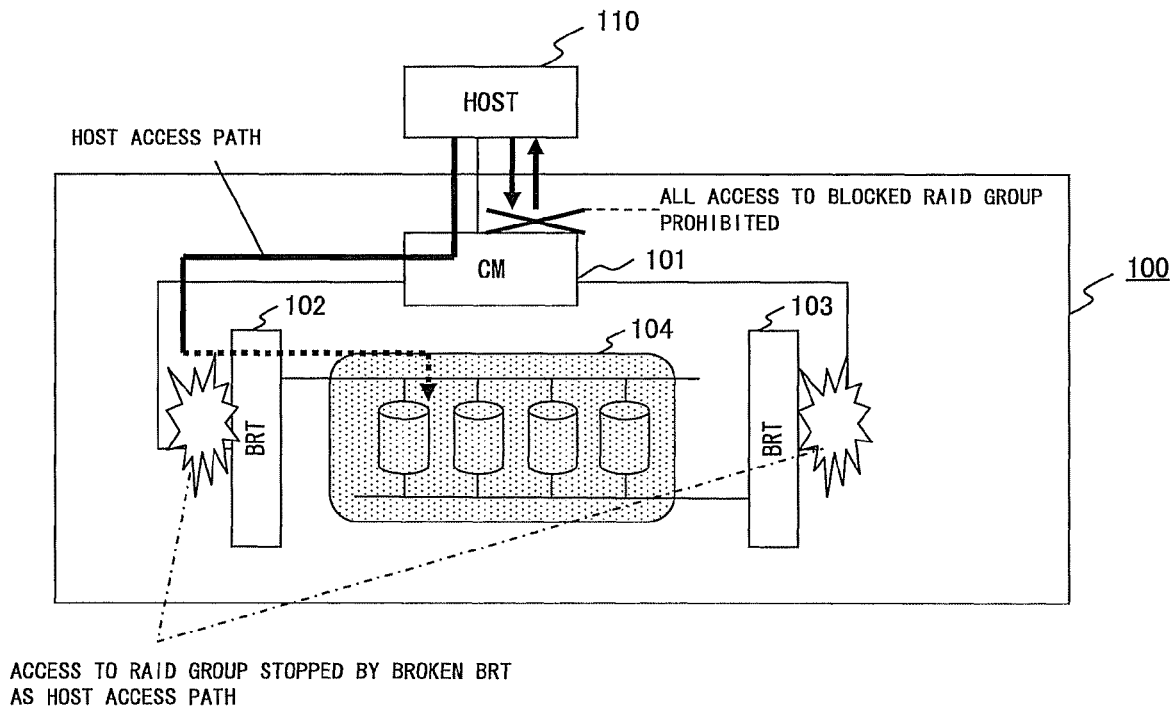
F I G. 1

(1) INDICATING STATUS OF RAID GROUP
(2) INDICATING STATUS OF DISK IN RAID GROUP
(3) INDICATING EVENT OCCURRENCE AS DEVICE

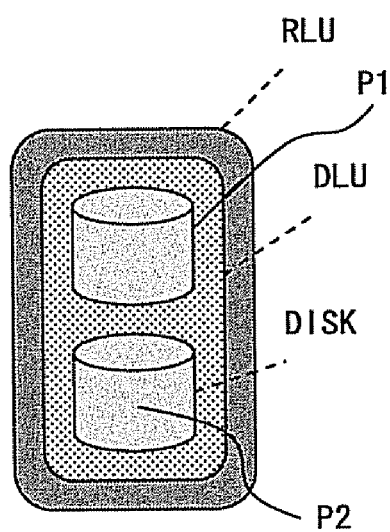
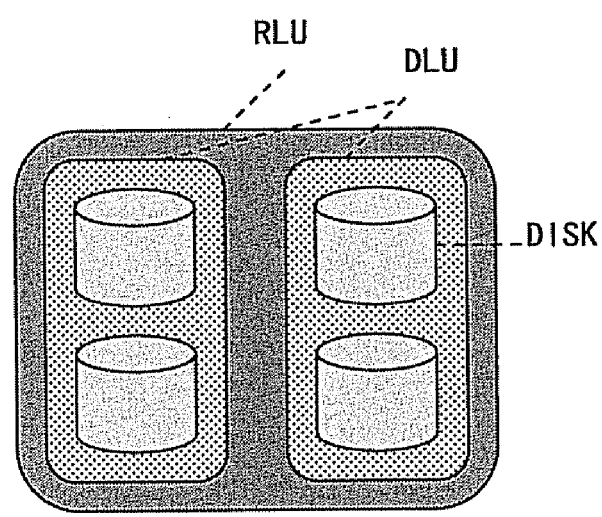
FIG. 3A — WHEN RAID 1
FIG. 3B — WHEN RAID 0+1

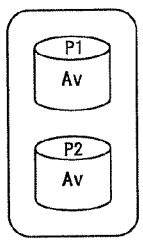
Available
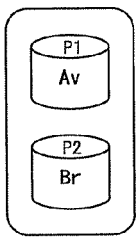
Exposed
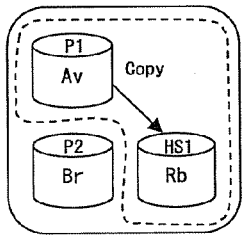
Rebuild
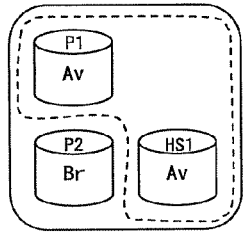
Spare In Use
FIG. 4A  FIG. 4B  FIG. 4C  FIG. 4D
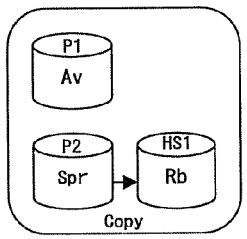
Redundant Copy
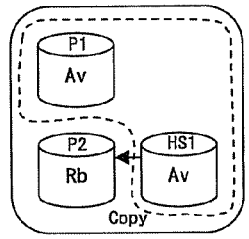
Copyback
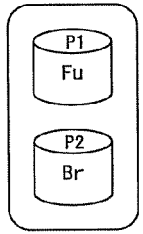
Broken
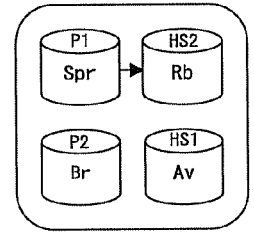
FIG. 4E  FIG. 4F  FIG. 4G  FIG. 4H
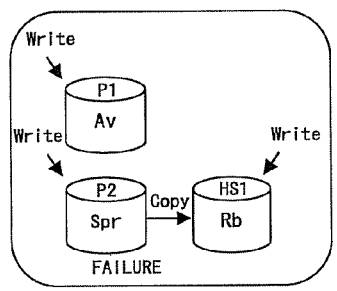
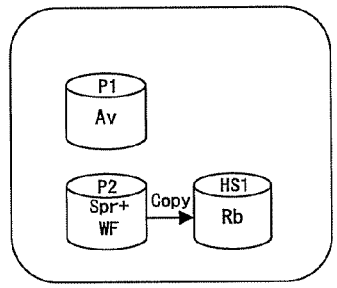
FIG. 4I  FIG. 4J

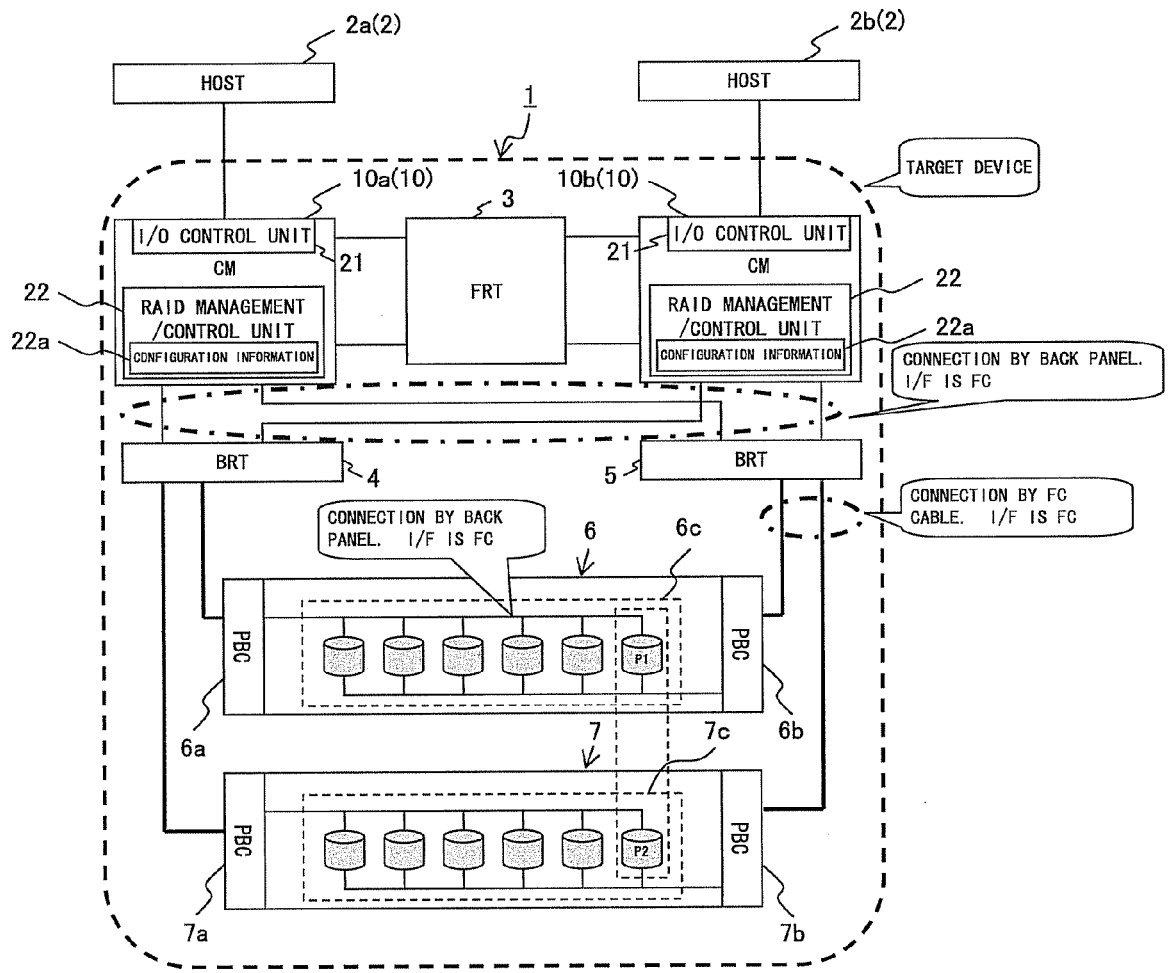
F I G. 6

| TOTALIZATION | EVENT |
|---|---|
| Use Disk | Available, Failed Usable, Sparing |
| Un Use Disk | STATUS OTHER THAN DESCRIPTIONS ABOVE |
| Loop Down Disk | (4) DISK OF AVAILABLE, FAILED USABLE, AND SPARING WITHOUT ACCESS PATH OF CORRESPONDING DISK<br>(5) DISK OF AVAILABLE, FAILED USABLE, AND SPARING AND A CHANGE TO STATUS NOT EXIST |
| SPECIAL EXAMPLE | REBUILD DISK DURING REDUNDANT NOT INCLUDED<br>DISK OF WRITE FAIL AND STATUS SPARING COUNTED AS "UNUSED |

FIG. 8A

| RAID Level | Use Disk Count | Unuse Disk Count | Loop Down Disk Count |
|---|---|---|---|
| RAID 0 | – | 0 | 1 OR MORE |
| RAID 1/0+1 | 0 | – | 1 OR MORE |
| RAID 5/0+5 | – | 0 | 2 OR MORE |
| | – | 1 | 1 OR MORE |

FIG. 8B

RAID BLOCKING DETERMINING METHOD, RAID APPARATUS, CONTROLLER MODULE, AND RECORDING MEDIUM

BACKGROUND OF THE INVENTION

1. Field of the Invention

The present invention relates to a determination of blocking, etc. by a RAID apparatus.

2. Description of the Related Art

FIG. 1 shows the rough configuration of the conventional RAID system. In FIG. 1, a RAID apparatus 100 has a CM 101, BRTs 102 and 103, and a RAID group 104 including a plurality of disks. In FIG. 1, there is only one RAID group 104, but there are a plurality of groups in many cases. A host 110 issues to the CM 101 a request for access to any RAID group through any communication line.

The CM 101 manages and controls various disk access processes in the RAID apparatus 100. The BRTs 102 and 103 are positioned between the CM 101 and the RAID group 104, and function as switches for connecting the CM 101 to the RAID group 104. There are two paths for the host 110 to access the RAID group 104 through the CM 101 (FIG. 1 shows only one access path), and each of the two access paths is provided with the BRTs 102 and 103. Therefore, although one of the paths becomes unavailable for any reason (for example, a broken BRT, etc.), access can be gained using another access path.

However, for example, both paths (both systems) can become unavailable. In the example shown in FIG. 1, the BRTs 102 and 103 are broken. In this case, all RAID groups 104 cannot be accessed (In FIG. 1, there is only one RAID group 104, but there are a plurality of groups in many cases).

As described above, when a RAID group cannot be accessed in the RAID apparatus, and if the host 110 continues issuing an access request, the RAID apparatus 100 determines a broken disk, and finally a broken RAID group is determined, thereby possibly losing user data. Since the host 110 tries to gain access although it is not possible, it becomes the cause of a delay in a host process.

Therefore, except when the cause of inaccessibility is a disk, a RAID is temporarily placed in a blocked status. RAID blocking refers to a status in which the status of an inaccessible RAID group is maintained in the same status as before the blocking, and host access is inhibited. Thus, the user data is protected, and the access of the host is immediately put to abnormal termination.

The host access can be accepted upon resolution of the cause of blocking in the blocked RAID group.

The problem is the method of determining whether or not RAID blocking is to be performed.

FIG. 2 shows an example of the conventional RAID blocking determining method. FIG. 2 shows a block determining method corresponding to the case in which a RAID group to be determined is a RAID 1.

As indicated in the table shown in FIG. 2, it has been conventionally registered whether or not a RAID group is to be blocked depending on the combination between an "event in which RAID can be blocked" (event (3) occurring as a device) and a "status of each disk in a DLU unit" (2). When one of the "events in which RAID can be blocked" occurs, the table is referred to, and it is determined whether or not the RAID group is to be blocked. The table is stored in the memory, etc. of the CM 101, and it is determined by the CM 101. In this table "o" indicates blocking, and "x" indicates not blocking.

The "events in which RAID can be blocked" are, in the examples shown in FIG. 2, a "broken BRT pair", a "broken port of a BRT pair", a "broken BRT pair (BRT straddle)", a "broken port of the BRT pair (BRT straddle)", a "P1 transition to Ne (not exist)", etc., and various other events can also occur.

The "broken BRT pair" refers to, for example, both BRTs 102 and 103 have been broken. Therefore, in this case, all "o (blocking)" is indicated regardless of the status of each disk.

The "broken port of the BRT pair" refers to, for example, the case where the ports connected to the same RAID group in the BRTs 102 and 103 are broken. The "BRT straddle" refers to the case where the disks belonging to the same RAID group are connected to different systems. For example, as shown in FIG. 5, a disk P1 connected to the systems of a BRT 0 and a BRT 1 and a disk P2 connected to a BRT 2 and a BRT 3 belong to the same RAID group.

Described below is the meaning of each symbol (indicating a status) shown in FIG. 2.

The DLU is explained first. As shown in FIGS. 3A and 3B, the RLU refers to the RAID group itself, and the DLU refers to a concept of a connection of a logical volume to a physical volume. The DISK refers to each hard disk itself. As shown in FIG. 3A, in the case of a RAID 1, the DLU and the RLU store the same contents. Therefore, the DLU shown in FIG. 2 can be replaced with the RLU.

The disks P1, P2, HS1, and HS2 shown in FIG. 2 are the names assigned to each disk constituting one RAID group. As shown in FIG. 3A, in the RAID 1, the RAID group is constituted by two disks (P1 and P2), and the same data is written to both disks P1 and P2. Practically, spare disks (referred to as hot spares) are prepared as indicated by the disk HS1 and disk HS2 shown in FIG. 2.

The meanings of the symbols such as Av, Br, etc. indicating the statuses of the DLU and each disk shown in FIG. 2 are described below.

That is, Av (available indicating an available status, Br (broken indicating a broken status), Fu (failed usable indicating a read permitted status when a RAID is faulty), Ex (exposed indicating an exposed status), Ne (not exist indicating a temporarily invisible status due to loop down, etc.), Rb (rebuild indicating a rebuild status), Spr (sparing indicating a redundant copy status), SiU (spare in use indicating a hot spare in use status, Cp (copyback indicating a copyback status), and an SpW (Spr+WF) status.

As shown in FIG. 2, depending on the status of each disk constituting the DLU/RLU, the status of the DLU/RLU is determined. For example, if both disks P1 and P2 are in the available status (Av), the DLU naturally becomes available status (Av) It is explained below by referring to FIG. 4.

The case shown in FIG. 4A is described above. In this available status, when one of the disks becomes broken status, its DLU becomes the exposed status (Ex) (FIG. 4B). As shown in FIG. 2, when the disk becomes Ne status, not the broken status (Br), the DLU becomes the exposed status. Otherwise, for example, when the disk P1 are poor condition, the disk P1 is put in the Spr status, the disk HS1 is put in the Rb status, and the data of the disk P1 is copied to the disk HS1, thereby bringing the disk P2 into the Br status. In this case, the DLU becomes the exposed status.

When the status shown in FIG. 4B is entered, it is necessary that two or more disks store the same data in the RAID 1. Therefore, to use the above-mentioned hot spare (HS 1 in this example), the stored data in the disk P1 is copied to the disk HS1 as shown in FIG. 4C. In this status, the disk HS1 is in the Rb status, and the DLU is also in the Rb status. When the data is completely copied, the disk HS1 becomes the available status as shown in FIG. 4D. Thus, the status of the DLU in the available status using the hot spare enters the Siu status.

When any fault but not a broken status occurs and there is fear in continuously using the disk (P2 in this example), the disk P2 is put in the Spr status as shown in FIG. 4E, and the hot spare (HS1 in this example) is put in the Rb status, and the data on the disk P2 is copied to the hot spare. The status of the DLU is the redundant copy (Spr) status.

While the normal operation is being performed using the hot spare and, for example, the disk P2 becomes available, the disk P2 is put in the Rb status as shown in FIG. 4F, and the stored data is copied to the disk P2. The status of the DLU at this time is the copyback (Cp) status.

Furthermore, as shown in FIG. 4G, when one of the disks P1 and P2 is in the Fu status, and the other is in the Br status, the DLU is in the Br status. When the RAID group come to be in the unavailable status (when both disks P1 and P2 are broken), the disks broken then are not put in the Br status. In the example shown in FIG. 4G, the disk P2 is in the Br status because the disk P2 first falls in the broken status. However, when the disk P1 is broken afterwards, it is not put in the Br status, but put in the Fu status, thereby saving the most possible stored data. In the case of the RAID 1, the device is not put in the unavailable status when only one disk is broken, but in the case of the RAID 0, the device is put in the unavailable status when only one disk is broken. Therefore, there is no disk which is placed in the Br status.

The DLU is in the Siu status in the status shown in FIG. 4H in addition to the status shown in FIG. 4D. In FIG. 4H, since the disk P1 additionally becomes faulty from the status shown in FIG. 4D, the disk P1 is put in the Spr status, and the data is being copied to the disk HS2 (naturally the disk HS2 is in the Rb status).

As shown at the upper right in FIG. 2, for example, when the disk P2 is not in the Spr status, but in the SpW (Spr+WF) status, the DLU assumes that it is in the Spr status. The "Spr+WF" is explained by referring to FIGS. 4I and 4J.

First, as shown in FIG. 4I, it is assumed that a write occurs when the disk P1 is in the Av status, the disk P2 is in the Spr status, the disk HS1 is in the Rb status, and data is being copied from the disk P1 to the disk HS1. In this case, the write is performed on all disks as shown in FIG. 4I. Then, as shown in FIG. 4I, it is assumed that the write has failed on the disk P2. Since the disk P2 stores the OLD data on the disk P2 (the status before the write), data cannot be read from the disk P2. Therefore, as shown in FIG. 4J, the disk P2 is put in the "Spr+WF" status. However, in this status, the copy from the disk P2 to the disk HS1 is continued. FIG. 2 show this status at the upper right portion.

In addition, the technologies disclosed by the patent documents 1, 2, and 3 are well known.

The invention disclosed by the patent document 1 is an error retrial method in which the determining process by a computer can be reduced and a wasteful retrial process can be reduced in the fault recovery process when a fault occurs at an input/output operation request to the peripheral device having a disk device.

The invention disclosed by the patent document 2 is a method of automatically bypassing the device connected to the HUB for each port by the cooperation of various monitors when a fault occurs in a FC-AL connected system, collecting fault information by executing the T & D, and managing the information with the log information.

The invention of the patent document 3 is a method of blocking a device path to prevent the influence of a fault by blocking only a corresponding device path if the fault depends on a device path according to a fault notification from the disk subsystem.

[Patent Document 1] Japanese Published Patent Application No. 2000-132413

[Patent Document 2] Japanese Published Patent Application No. 2000-215086

[Patent Document 3] Japanese Published Patent Application No. H4-291649

In the above-mentioned conventional system shown in FIG. 2, there are the following problems (1) through (4), etc.

(1) Each time the "event in which RAID can be blocked" increases, the event is added to the table, and it is necessary to set the possibility of the RAID blocking depending on the combination of the additional event and various "statuses in which the RAID group is put", thereby requiring laborious operations.

(2) When an event which cannot be handled only using the table shown in FIG. 2 occurs, it is necessary to perform exceptional handling.

(3) As a result of adding the exceptional handling described in (2) above, the logic becomes complicated, and it is hard to perform appropriate maintenance.

(4) Since the "event in which RAID can be blocked" is designated, a logic cannot be shared, and the number of source codes increases.

The patent documents 1 through 3 have nothing to do with solving the above-mentioned problems. That is, the invention according to the patent document 1 relates to the retrial process for the disk device, and does not relate to the method for handling an error in the disk device. The invention of the patent document 2 relates to a recovery method and collecting fault information/log information as a system when a fault occurs in any subsystem, and has nothing to do with the method for handling error in a subsystem (in the disk device in this example). The patent document 3 is the invention for regarding a device path, automatically blocking the device path when it is in an abnormal condition, and minimizing the influence on the system, but does not relate to the protection of data of the RAID group in the device path blocked after the device path is blocked.

SUMMARY OF THE INVENTION

The objective of the present invention is to provide a RAID blocking determining method for use with a RAID apparatus, a RAID apparatus, its controller module, and a program, etc. relating to a determining process for the possibility of RAID blocking, greatly reducing the setting operation for the process, enhancing the maintenance, reducing the complexity of coding, and using the determining logic shared among various RAID levels.

The first controller module of the present invention in a RAID apparatus having a RAID group constituted by a plurality of disks includes a RAID management/control device for classifying each disk each time a specific event on which the possibility of RAID blocking is determined occurs in the RAID apparatus for each RAID group to be blocked based on the status of each disk belonging to the RAID group or the presence/absence of an access path to each disk, totalizing the number of corresponding disks for each classification unit, comparing each of the totalizing results with a predetermined threshold condition, and determining whether or not the RAID group is to be blocked.

In the above-mentioned first controller module, regardless of what the "event in which RAID can be blocked" is, the classification and totalization are performed in a predetermined classifying method, and the totalization result is compared with the threshold condition, thereby determining the possibility of RAID blocking. Since the determining logic can be shared, it is not necessary to add a determining logic although the "event in which RAID can be blocked", and no exceptional handling is to be added. Thus, the maintenance performance can be improved, and only the setting of a threshold for each RAID level is required.

The second controller module of the present invention in a RAID apparatus having a RAID group constituted by a plurality of disks includes an I/O control device as an interface between the controller module and any external host device, and a RAID management/control device for managing and controlling determination of possibility of blocking of any of the RAID group in the RAID apparatus and execution of blocking. The RAID management/control device determines whether or not the RAID group can be recovered in a short time when the RAID group is executed, and when the device determines the recovery can be performed in a short time, the determination is noticed to the I/O control device. The I/O control device returns a dummy response to the host device when the notice is received and the host device requests access to the blocked RAID group.

When the blocking of the RAID group is performed, all access from the host device is normally rejected. Therefore, the processes performed by the host device are abnormally terminated. However, if the blocked RAID group can be recovered in a short time, the host is kept waiting for some time by returning a dummy response to the host. Thus, the processes so far performed can be prevented from being abnormally terminated.

BRIEF DESCRIPTION OF THE DRAWINGS

FIG. 1 shows the rough configuration of the conventional RAID system;

FIGS. 3A and 3B are explanatory views of the RLU/DLU;

FIGS. 4A through 4J are explanatory views of possible statuses of the RAID group;

FIG. 6 shows the configuration of the RAID apparatus according to the present invention;

FIGS. 8A and 8B are explanatory views showing the method for determining the possibility of blocking according to the present invention;

DESCRIPTION OF THE PREFERRED EMBODIMENTS

Figure 2:
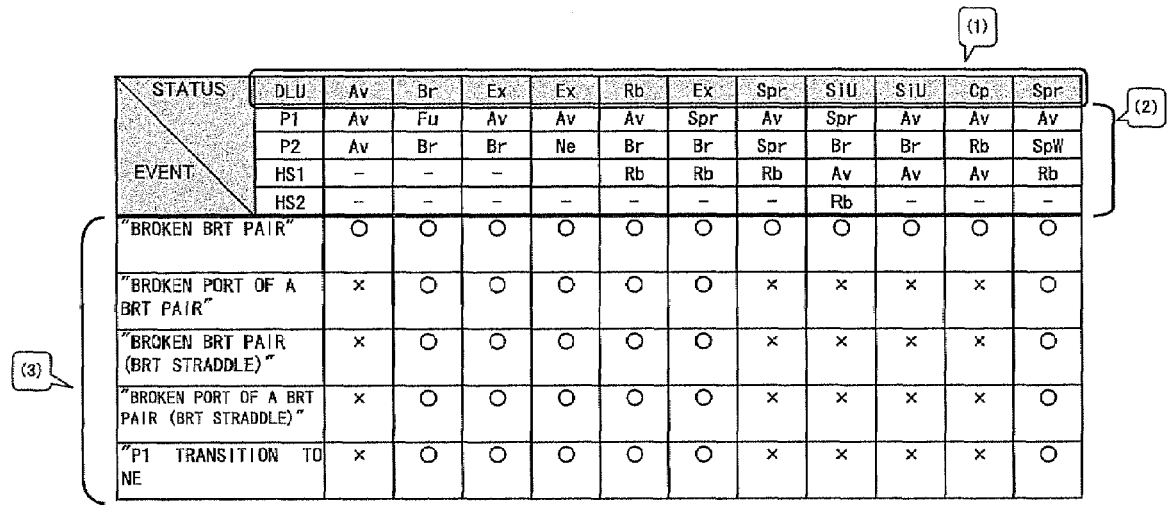
FIG. 2 is an explanatory view of the conventional RAID blocking determining method.
Figure 5:
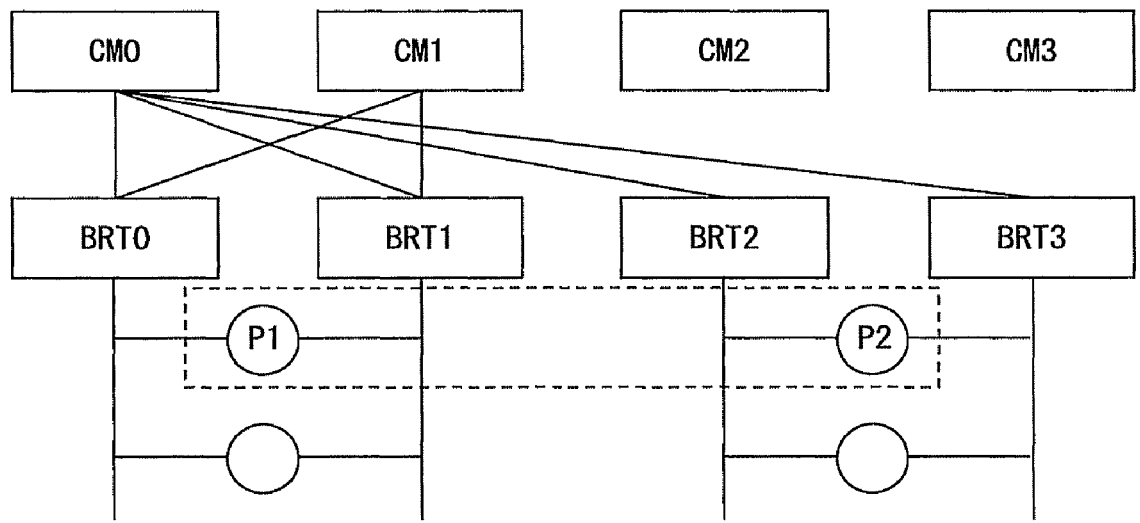
FIG. 5 is an explanatory view of the "BRT straddle"

The embodiment for embodying the present invention is described below by referring to the attached drawings.

FIG. 6 shows the configuration of a RAID apparatus 1 according to an embodiment of the present invention.

The RAID apparatus 1 shown in FIG. 6 has two CMs 10 (10*a* and 10*b*), an FRT 3, a BRT 4, a BRT 5, a DE 6 and a DE 7.

The CM 10 and BRTs 4 and 5 are described above in the Description of the Related Art. The CM indicates a centralized module, and the BRT indicates a backend router. In this example, CM 10*a* is connected to the two systems, that is, the BRT 4 and the BRT 5, and the CM 10*b* is connected to the two systems, that is, the BRT 4 and the BRT 5. The RAID blocking possibility determining process, etc. described later is separately performed by each of the CMs 10*a* and 10*b*. The FRT 3 relays and controls the communication between the CM 10*a* and the CM 10*b*.

The DE 6 has PBCs 6*a* and 6*b*, and a disk group 6*c*. Similarly, the DE (drive enclosure) 7 has a PBCs 7*a* and 7*b* and a disk group 7*c*. For example, the disk P1 in the disk group 6*c* as shown in FIG. 6 and the disk P2 in the disk group 7*c* as shown in FIG. 6 form one RAID group (for example, a RAID 1). It is obvious that the configuration is not limited to this example. For example, there can be a case where a RAID group of the "BRT straddle" explained above in the Description of the Related Art, and a case where a RAID group is formed in one disk group. Furthermore, there can be a case where the same RAID level is applied in the entire system when there are a plurality of RAID groups, but different RAID levels can be applied. The RAID level of each RAID group is stored and managed by the CM 10.

A PBC indicates a port bypass circuit.

Each port of the BRT 4 is connected to the PBC 6*a* and the PBC 7*a*, and each port of the BRT 5 is connected to the PBC 6*b* and the PBC 7*b*. Each CM 10 accesses the disk group 6*c* and the disk group 7*c* through the BRT 4 or the BRT 5 and the PBC.

Each CM 10 is connected to a host 2 (2*a* and 2*b*) through any communication line. Each CM 10 has an I/O control unit 21, and the I/O control unit 21 executes the communication (reception, response, etc. of host access) with the host 2. Each CM 10 has a RAID management/control unit 22.

The RAID management/control unit 22 acquires at any time the statuses of each part (BRT, PBC, etc.) in the RAID apparatus 1 and each disk, and stores them as configuration information 22*a*. The configuration and the operation are the same as in the conventional system, and are not specifically explained here, or a practical example of the 22*a* is not shown here. The RAID management/control unit 22 refers to the configuration information 22*a*, etc., checks an access path to each disk, and determines the possibility of the RAID blocking. In the conventional technology, as described above, the status, etc. of each disk with the configuration information 22*a* is referred to, and the possibility of the RAID blocking is determined. However, the present invention uses a different method. The feature of the present invention resides mainly in the RAID management/control unit 22. That is, the feature resides in the method of determining the possibility of RAID blocking by the RAID management/control unit 22, the method of determining the possibility of short time recovery, etc. The details are described later.

The determination result of the possibility of RAID blocking is similar to that in the conventional technology. That is, the ground (reason) for determining whether or not a RAID is to be blocked is the same as in the conventional technology, and the determination result itself is still the same. However, in the method according to the present invention, the above-mentioned conventional problems can be solved by the determination using the "classification" and "threshold" described later.

The RAID management/control unit 22 also performs blocking, releasing, etc. on a RAID. It is connected to each CM 10 and each of the BRTs 4 and 5, and an I/F (interface) is an FC (fiber channel). Each of the BRTs 4 and 5 is connected to each of the DEs 6 and 7 through an FC cable, and the I/F (interface) is an FC (fiber channel). Each disk in each of the DEs 6 and 7 is connected through a back panel, and the I/F (interface) is an FC (fiber channel). Each disk is accessed through an FC loop. Therefore, when the loop is broken by a fault, etc. of an upper disk in a plurality of disks on the FC loop, there can be a case where a lower disk cannot be accessed.

Figure 7:
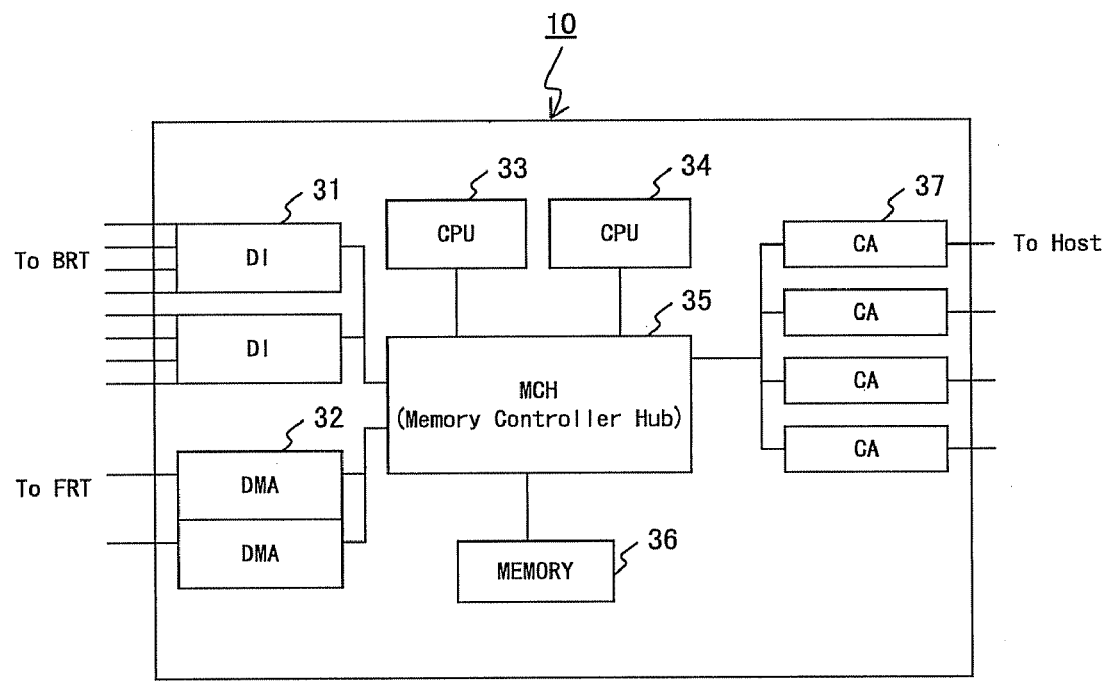
FIG. 7 shows the configuration of the hardware of the CM shown in FIG. 6.

FIG. 7 shows the configuration of the hardware of the CM 10.

The CM 10 shown in FIG. 7 has each DI 31, each DMA 32, two CPUs 33 and 34, an MCH (memory controller hub) 35, memory 36, and a CA 37.

The DI 31 is an FC controller connected to each BRT. The DMA 32 is a communication circuit connected to the ERT 3. The MCH 35 is a circuit for connection of a bus on the host side such as an external bus, etc. of the CPUs 33 and 34 to a PCI bus for mutual communications. The CA 37 is an adapter for connection to a host.

Described below first is the first embodiment for embodying the present invention.

The processes of various flowcharts described later according to the first embodiment for embodying the present invention are realized by the CPU 33 or 34 reading and executing an application program stored in advance in the memory 36. This also holds true in the second embodiment for embodying the present invention described later. The threshold condition data, etc. shown in FIG. 8B is also stored in the memory 36 in advance, and the threshold condition data is referred to as described later when the above-mentioned blocking possibility determining process is performed.

FIG. 8 is an explanatory view of the blocking possibility determining method according to the first embodiment for embodying the present invention.

In the blocking possibility determining process according to the present embodiment, for example, when any of the above-mentioned "event in which RAID can be blocked" occurs, the process is started. In this method, the blocking possibility is not recorded for each "event in which RAID can be blocked" as in the conventional technology. The occurrence of an "event in which RAID can be blocked" is only a trigger for the start of a process, and the determination of the blocking possibility is performed by the totalization in accordance with the standard shown in FIG. 8A based on the status of each disk and the presence/absence, etc. of an access path to each disk (each disk is classified into a plurality of categories (in this example, three types of totalization unit as shown in FIG. 8) and the number of disks corresponding to each category is counted), and a result of the totalization is compared with the threshold condition shown in FIG. 8B.

Described below first is FIG. 8A.

In performing the RAID blocking determination, discrimination is performed as to which disk can be used for any RAID group, and it is necessary to determine whether or not access can be gained as a RAID group.

Therefore, each disk in a RAID group is classified depending on its status. As shown in FIG. 8A, it is classified into any of "used disk", "unused disk", and a "loop-down disk". As described above in the Description of the Related Art, a RAID group refers to the RLU. Therefore, the classifying/totalizing process and the comparing/determining process using a threshold condition (that is, the RAID blocking determining process) are performed for each RLU.

Basically, the "used disk" is an accessible disk, the "unused disk" is an inaccessible disk. However, the "unused disk" corresponds to a disk that cannot be accessed due to a fault of the disk. A disk that cannot be accessed by a lost of an access path is classified into a "loop-down disk" and is discriminated from a broken disk.

What is described above is listed by showing practical statuses of disks as shown in FIG. 8A.

As shown in FIG. 8A, a disk classified into a "used disk" is a disk in any status of an available status, a failed usable status (only a read is permitted for a broken RAID), and a sparing status (redundant copy status). However, in any of these statuses, what corresponds the condition of the "loop-down disk" described later is classified into a "loop-down disk".

A disk classified into an "unused disk" is a disk in a status not corresponding to the "used disk". For example, it is a disk in any status of the broken status, the rebuild status, the not exist status (however, when the special example 2 described later is applied, it is not limited to these statuses) The not exist status is counted as a "loop-down disk" when the case (5) described later can be applied.

The status of a disk is not limited to the types shown in FIG. 2. Examples of the statuses to be classified into an "unused disk" although not shown in FIG. 2 are listed below. However, in the explanation below, the status not shown in FIG. 2 is not considered.

not available: status in which no disk is loaded.

not supported: status in which a disk smaller than a defined capacity is loaded.

present: disk waiting for a redundant/copyback status readying: status in which a disk is being loaded.

spare: disk in a normal status as a hot spare (since it is not included in a RAID group, it is processed as an "unused disk").

A disk classified into a "loop-down disk" satisfies any of the following conditions (4) and (5).

(4) One of the available, failed usable, and spare statuses without an access path of the corresponding disk.

(5) One of the available, failed usable, and spare statuses during transition (change) to a not exist status.

However, as a special example, the following conditions can be added.

Special Example 1

A redundant rebuild disk is not included in the totalization.

Special Example 2

In the sparing status, a write failure disk is not a "used disk", but is classified into an "unused disk".

The above-mentioned (5) is explained below. First, although not shown in FIG. 6, the CM 10 conventionally includes a function unit (referred to as an RAS) for monitoring and detecting the status of each part (BRT, PBC, etc.) in the RAID apparatus 1, the status of an access path to each disk, and the status of each disk. The RAS notifies the RAID management/control unit 22 of each detection result. Upon receipt of the notification, the RAID management/control unit 22 updates the configuration information 22a. The determination of the classification is basically performed by the RAID management/control unit 22 by referring to the configuration information 22a.

"During transition (change)" in (5) above refers to the status in which the RAID management/control unit 22 has received a notification of a new disk status from the RAS, but the configuration information 22a has not been updated. Therefore, the meaning of (5) above is that the RAS has notified the RAID management/control unit 22 that the status of any disk has changed into the not exist status, but the RAID management/control unit 22 has not reflected the change in the configuration information 22a.

The RAID management/control unit 22 of a CM (centralized module) basically recognizes the status of each disk by referring to the configuration information 22a, checks the access path to a disk as necessary, performs the classification based on the process result, and totalizes the number of disks classified into the "used disk", "unused disk", and "loop-down disk". Then, by referring to the RAID blocking threshold table (threshold condition) shown in FIG. 8B, the blocking possibility is determined using the totalization result. The RAID blocking threshold table shown in FIG. 8B stores the threshold condition corresponding to each RAID level as shown in the figure, and the CM refers to the threshold condition corresponding to the RAID level in the RAID group to be determined, compares it with the totalization value, and determines the blocking possibility. When the totalization value corresponds to a threshold condition, it is determined that the blocking is performed.

As shown in FIG. 8B, when the RAID level of the RAID group to be determined is RAID 0, and when the number of "unused disks" is 0, and the number of "loop-down disks" is 1 or more regardless of the number of "used disks", it is determined that the RAID group is put in the blocked status. As described above in the Description of the Related Art, in the case of the RAID 0, there is no "unused disk" because an unavailable status occurs with only one broken disk. Therefore, as described above by referring to FIG. 4G, it is determined that the Fu status, not the Br status, is assumed. Therefore, there is no disk as "rebuild", or no copy status occurs for a hot spare. Therefore, the condition of the number of "unused disks" is 0 indicates the explicit confirmation only, and the condition can be omitted.

When the RAID level of the RAID group to be determined is RAID 1 or RAID 0+1, and when the number of "used disks" is 0, and the number of "loop-down disks" is 1 or more regardless of the number of "unused disks", it is determined that the RAID group is put in the blocked status.

When the RAID level of the RAID group to be determined is RAID 5 or RAID 0+5, and when one of the two types of threshold conditions is satisfied, it is determined that the RAID group is put in the blocked status. That is, the two types of threshold conditions are independent of the number of "used disks" (any number is accepted). One threshold condition is "the number of 'unused disks' is '0', and the number of 'loop-down disks' is '2' or mores, and the other threshold condition is "the number of 'unused disks' is '1', and the number of 'loop-down disks' is '1' or more".

The threshold shown in FIG. 8B is used to uniquely determine the status in which user data cannot be guaranteed for each RAID level. For example, in the case of the RAID 0, "striping" is indicated, and user data is lost by only one broken disk. In the case of the RAID 1, "mirroring" is indicated, and a mirror disk exists although there is one broken disk, thereby guaranteeing user data.

In the above-mentioned blocking possibility determining method, the following effects (1) through (4) can be obtained.
(1) Reducing the complexity of coding by sharing a logic
(2) Improving the maintenance by sharing a logic
(3) No necessity to add or change the logic although occurrence events increase (only the trigger of starting a process increases)
(4) Although the RAID levels increase, the problem can be solved by adding new threshold conditions.

FIGS. 9 through 12 show flowcharts of the RAID blocking determining process according to the present embodiment. These flowcharts show the classifying method and the determining method using a threshold explained above by referring to FIGS. 8A and 8B as the executing procedures by a computer. A computer refers to the CM described above. The memory of the CM stores the program to be executed by the CPU 33 or the CPU34 in the RAID blocking determining process shown in FIGS. 9 through 12. In function, the processes shown in the flowcharts in FIGS. 9 through 12 are performed by the RAID management/control unit 22. The processes shown in other flowcharts are similarly performed.

Figure 9:
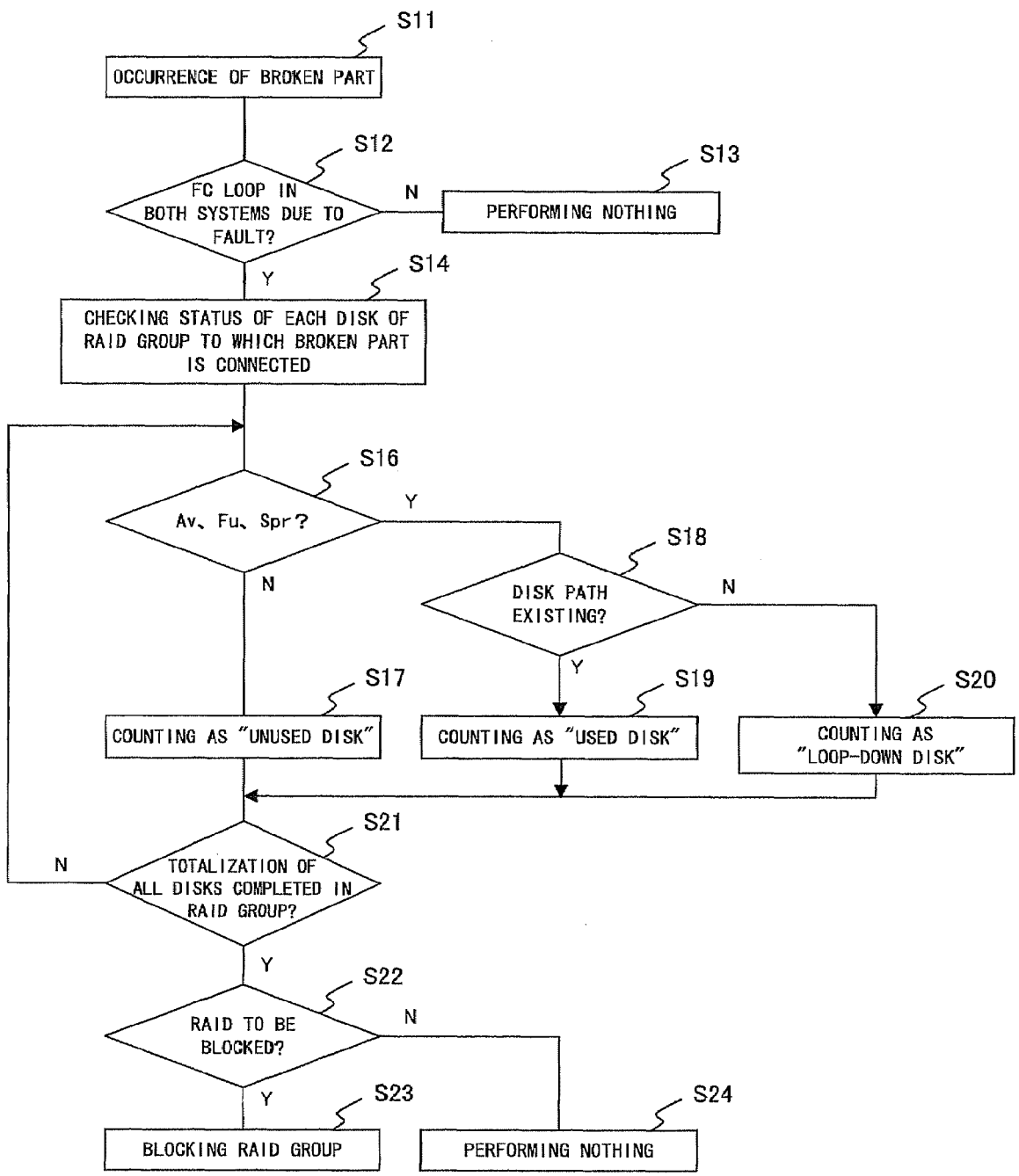
FIG. 9 is a flowchart (1) of the RAID blocking determining process according to an embodiment of the present invention.

The process shown in FIG. 9 is explained below. The process shown in FIG. 9 is a process for which the above-mentioned special examples 1 and 2 are not considered.

In the process shown in FIG. 9, the RAID blocking determining process (in and after step S14) in the present embodiment is performed when any broken part occurs (step S11), and when the broken part brings both systems into the FC loop-down status (YES in step S12). Therefore, when both systems are not in the FC loop-down status, (NO in step S12), the process is not performed (step 13).

The determination in steps S11 and S12 are the same as that in the conventional technology. In the conventional technology, when the determination in step S12 is YES, the process of designating the "event in which RAID can be blocked" is performed, and the possibility of the RAID blocking is determined using the designated event by referring to the table shown in FIG. 2.

In the present method, when the determination in step S12 is YES, the processes in steps S14 through S24 are performed for each RAID group on the entire RAID group to which the broken part is connected. That is, first, the status of each disk in the RAID group is checked (step S14). For each disk, the processes in steps S16 through S21 are performed.

First, when the status of a disk to be processed is any of Av (available), Fu (failed usable), Spr (Sparing) (YES in step S16), it is checked whether or not there is an access path to this disk (upper path from the disk) (step S18). If there is the path (YES in step S18), it is counted as a "used disk" (step S19). If there is not the path (NO in step S18), it is counted as a "loop-down disk" (step S20). If the status of the disk is other than Av, Fu, or Spr (NO in step S16), it is counted as an "unused disk" (step S17).

If the above-mentioned totalizing process is performed on all disks in the RAID group to be processed (YES in step S21), the possibility of the RAID blocking is determined by referring to the RAID blocking threshold table shown in FIG. 8B (by referring to the threshold condition corresponding to the RAID level of the RAID group to be processed) using the count value of "used disk", "unused disk", and "loop-down disk" obtained in the above-mentioned process (step S22). If the determination in step S22 is YES, the RAID group is blocked (step S23). If it is NO, no process is performed (step S24).

On the other hand, the RAID blocking possibility determining process of the present method is performed not only a broken part occurs but also when any change occurs in a disk status. That is, as described above, the RAS monitors and detects the status of each disk, and notifies the RAID management/control unit 22 of the result of the monitoring or detecting process, and the RAID management/control unit 22 refers to the configuration information 22*a* and starts the process in FIG. 10 when there is a disk whose status has been changed.

That is, when a status of any disk is changed (step S81), the statuses of all disks belonging to the RAID group are checked in at least the RAID group to which the status-changed disk belongs, and the processes in steps S83 through S93 are performed on each disk, thereby performing the totalizing process.

That is, first, when the status of the disk to be processed (the status of the record in the configuration information 22*a*) is the status other than Av, Fu, and Spr (No in step S83), it is counted as an "unused disk" (step S88). If the status of the disk to be processed is any of Av, Fu, and Spr (YES in step S83), it is determined whether or not the disk to be processed is a disk to be changed (status-changed disk) (step S84). When it is not a disk to be changed (NO in step S84), the same processes as in the above-mentioned steps S18, S19, and S20 are performed (steps S85, S91, and S92). That is, it is checked whether or not there is an access path (upper path viewed from this disk) to a disk to be processed (step S85). If there is the path (YES in step S85), it is counted as a "used disk" (step S91). If there is no path (NO in step S85), it is counted as a "loop-down disk" (step S92).

On the other hand, if the disk to be processed is a disk to be changed (status-changed disk) (YES in step S84), and if the change is made from any of the statuses of Av, Fu, and Spr to the Ne status (not exist) (YES in step S86), it is counted as a "loop-down disk" (step S90). If the change is made from any of the statuses Av, Fu, and Spr to the status other than the Ne status (not exist) (NO in step S86), and if the status after the change is any of the statuses Av, Fu, and Spr (NO in step S87), it is counted as a "used disk" (step S89). If the change is made to the status other than Av, Fu, and Spr (YES in step S87), it is counted as an "unused disk" (step S88).

If the above-mentioned totalizing process is performed on all disks to be processed (YES in step S93), the processes in steps S94, S95, and S96 are performed. Since the processes in steps S94, S95, and S96 are the same as the processes in steps S22, S23, and S24, they are not explained here.

Described below is the process shown in FIG. 11. The process in FIG. 11 is the process in which the special example 1 is considered in the process shown in FIG. 9. In FIG. 11, the process step the same as the process in FIG. 9 is assigned the same step number, and the explanation is omitted here. Only the portions different from the processes in FIG. 9 are explained below. In this example, the process obtained by applying the special example 1 to the process in FIG. 9 is shown, but it is obvious that the special example 1 can be applied to the process shown in FIG. 10, This process is not specifically shown, but when the determination in step S83 is NO, the process in step S31 described later is added.

The process in FIG. 11 is different from the process in FIG. 9 in that when the determination in step S16 is NO, the process in step S31 is added. The process in step S31 is performed by determining whether or not the disk to be processed is a destination disk of the redundant copy (rebuild disk in the redundant copy status), and suppressing the process in step S17 if it is (YES in step S31). If the determination in step S31 is NO, it is counted as an "unused disk" (step S17).

That is, in the process shown in FIG. 9, the disk is counted as an "unused disk" of the determination in step S16 is NO. However, in this process, when the disk to be processed is a destination disk of the redundant copy, it is excluded from totalization targets.

Figure 11:
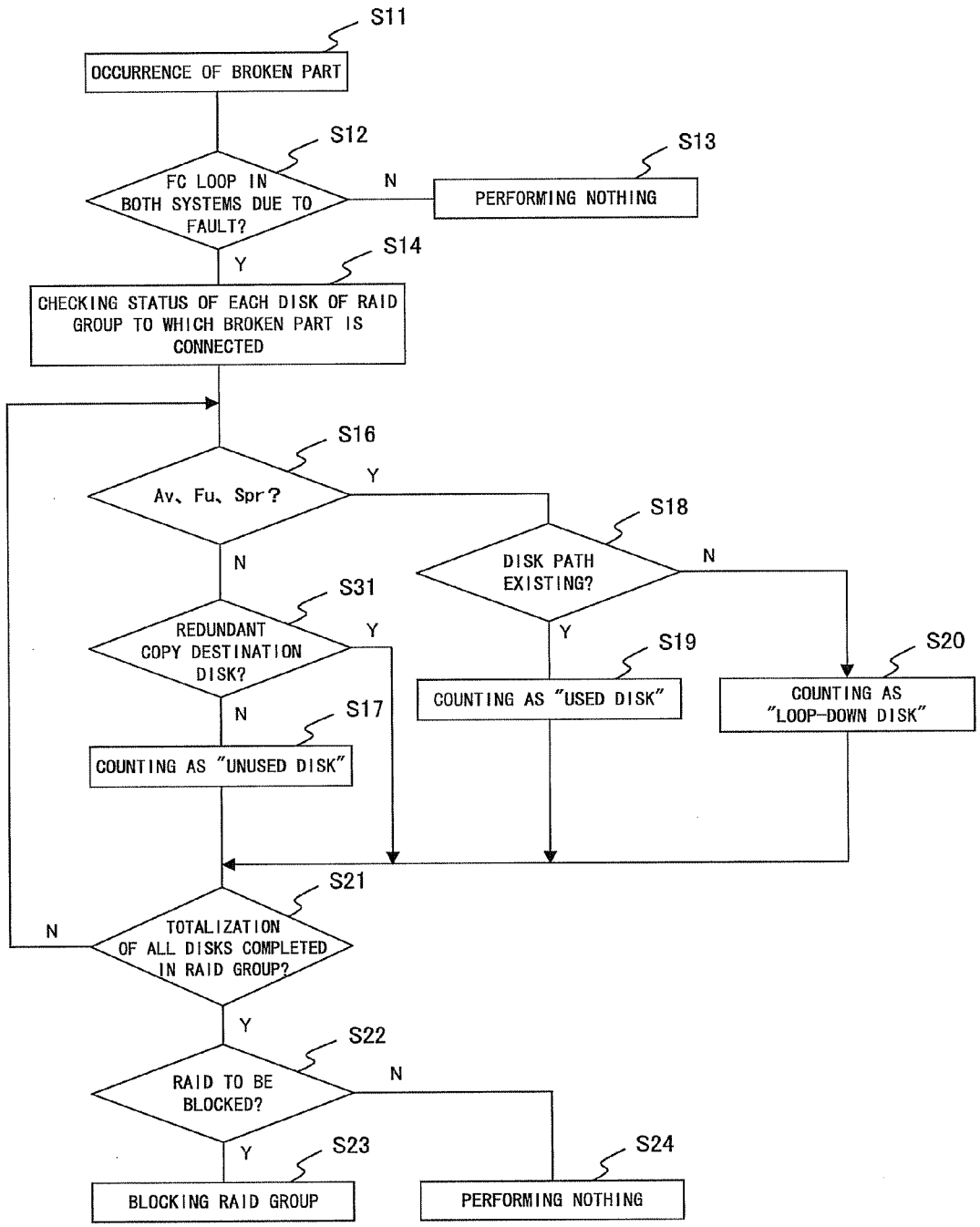
FIG. 11 is a flowchart (3) of the RAID blocking determining process according to an embodiment of the present invention.
Figure 12:
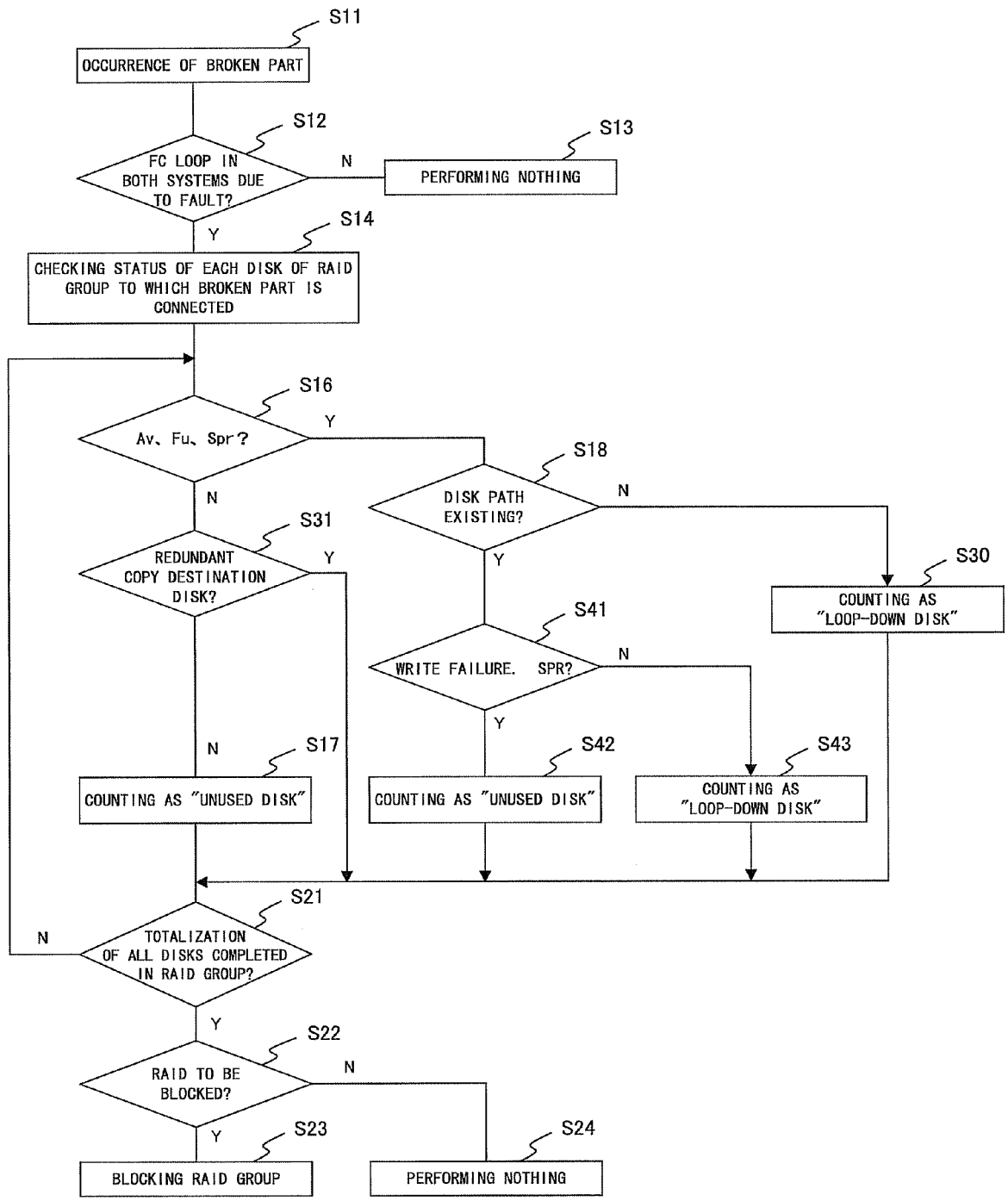
FIG. 12 is a flowchart (4) of the RAID blocking determining process according to an embodiment of the present invention.

Described below is the process in FIG. 12. The process in FIG. 12 is the process in which both the special examples 1 and 2 are considered. In FIG. 12, the same process step as in the process shown in FIG. 11 is assigned the same step number, an the explanation is omitted. Only the portion different from the process in FIG. 11 is explained below.

The point of the process shown in FIG. 12 different from the process shown in FIG. 11 is that the process in step S19 is replaced with the processes in steps S41 through S43 are performed when the determination in step S18 is YES.

When the determination in step S18 is YES, that is, when the status of the disk to be processed is any of Av (available), Fu (failed usable), Spr (sparing), and there is a path, the disk is always counted as a "used disk" in the processes shown in FIGS. 9 and 11, but in the present process, when the disk to be processed is a status of "sparing status and write failure" (that is, in the SpW status shown in FIG. 2) (YES in step S41), it is counted as an "unused disk" (step S42). It is obvious that in other cases (NO in step S41), it is counted as a "used disk" (step S43).

Figure 10:
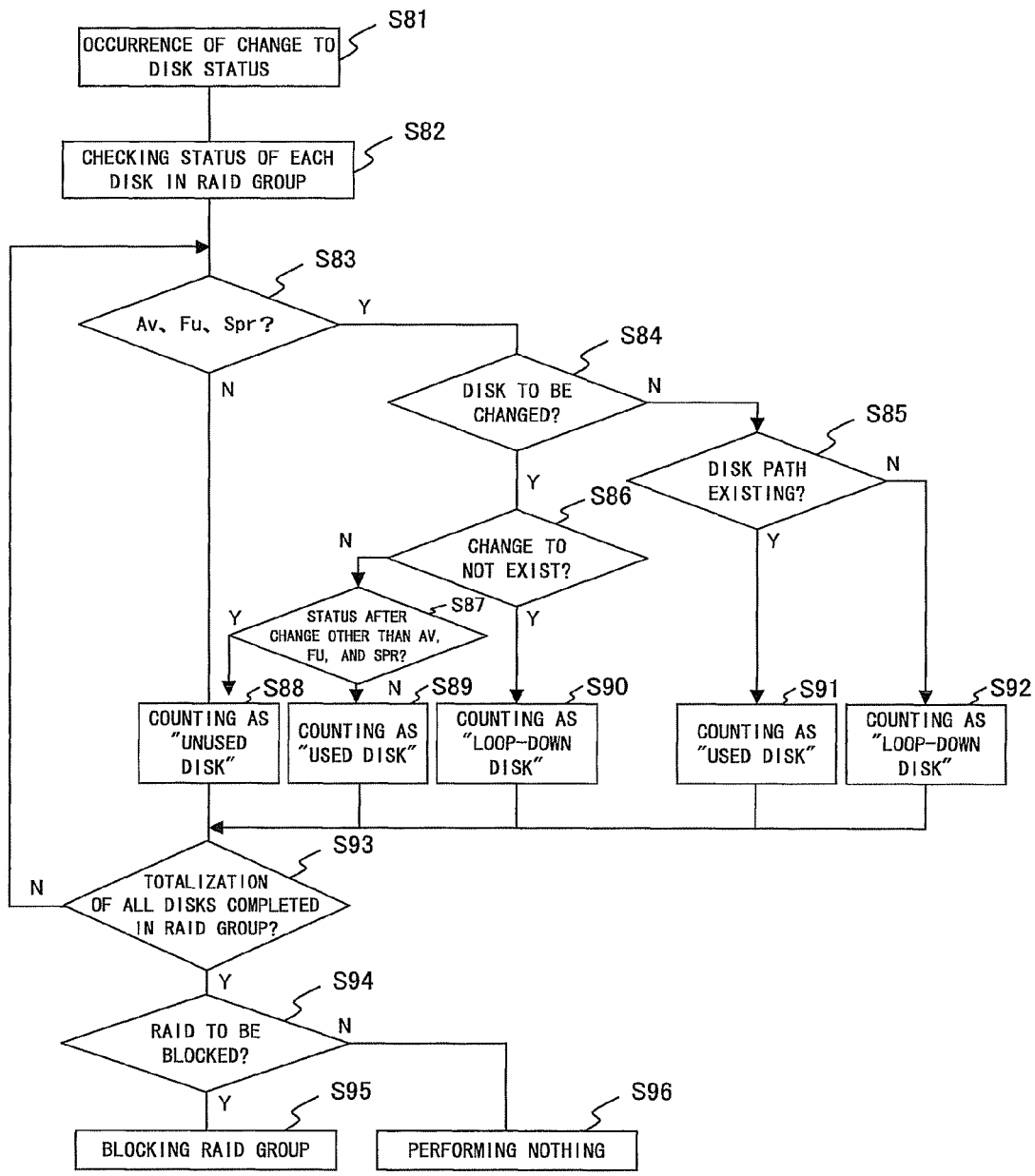
FIG. 10 is a flowchart (2) of the RAID blocking determining process according to an embodiment of the present invention.

In this example, the process obtained by applying the special examples 1 and 2 to the process shown in FIG. 9, but it is obvious that the special examples 1 and 2 can be added to the process shown in FIG. 10. This process is not specifically shown, but when the determination in step S83 is NO, the process in step S31 is added, and the process in step S91 is replaced with the processes in steps S41, S42, and S43.

The process explained above is described below by referring to practical examples.

Figure 13A:
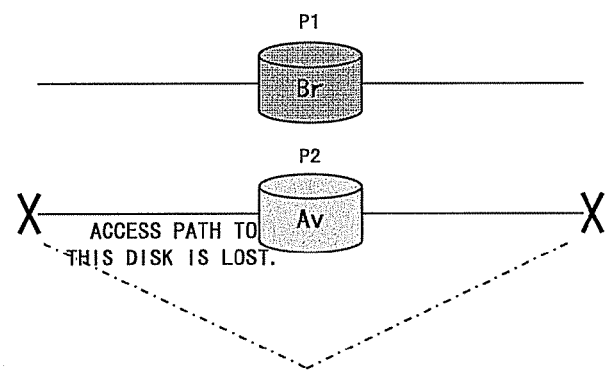
FIGS. 13A through 13C are explanatory views showing the processes in FIGS. 9 through 12.

FIG. 13A shows a practical example. In this example, in the two disks P1 and p2 of the RAID group having the RAID level of RAID 1, the disk P1 is in the Br status (broken status) and the disk P2 is in the Av status (available status), bur for any reason the access path of the disk P2 has been lost. In this example, when the process in FIG. 9 is performed, the determination is NO in step S16 for the disk P1. Therefore, it is counted as an "unused disk". Since the determination in step S18 is NO for the disk P2, it is counted as a "loop-down disk". Although the disk in the Br status is managed as normally excluded from the RAID group, it is clear from the example shown in FIG. 13A but in the totalizing process according to the present embodiment is included in the totalization with the disk in the Br status considered to belong to the RAID group.

Therefore, the totalization result is "used disk"='0', "unused disk"='1', "loop-down disk"='1'. In FIG. 8B, the threshold corresponding to the RAID 1 is "unused disk"='1', and "loop-down disk"='1 or more'. Therefore, it is determined that the blocking condition is satisfied, and the RAID group is to be blocked.

In the example shown in FIG. 13A, the blocking possibility can be determined without problem even in the process shown in FIG. 9. However, since the present process is performed on the RAID group having no redundancy, it is not considered that the rebuilding is performed with the redundancy kept as in the case of the redundant copy, etc., and there can be an erroneous determination.

Figure 13B:
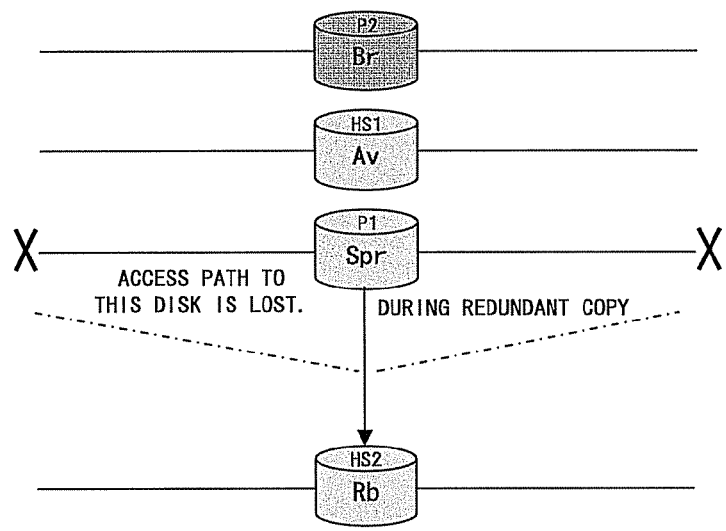

FIG. 13B shows an example. It is assumed that the RAID level of the RAID group shown in FIG. 13B is RAID 5

As shown in FIG. 13B, in this example, since the disk P2 is broken (Br), the hot spare (disk HS1 in this example) is used, and the disk HS1 enters the Av status. Afterwards, since the disk P1 becomes faulty, the disk P1 is put in the Spr status, and a process of copying (redundant copy) the data of the disk P1 is performed on the hot spare (disk HS2 in this example). However, during the copying process, an access path for the disk P1 has been lost for any reason.

In the above-mentioned case, the RAID group is to be blocked.

However, in the process shown in FIG. 9, the determination in step S18 is YES for the disk P1, and it is counted as a "loop-down disk", the disk HSL1 is counted as a "used disk", and the disks P2 and HS2 are counted as "unused disks", thereby obtaining the totalization result as follows.

"used disk"='1', "unused disk"='2', and "loop-down disk"

On the other hand, in FIG. 8B, the blocking condition corresponding to RAID 5 can be the two following variations.

"unused disk"='0', "loop-down disk"='2' or more
"unused disk"='1', "loop-down disk"='1' or more Therefore, the totalization result does not correspond to either of the above-mentioned two variations, and no blocking is determined.

Accordingly, the special example 1 is adopted, and the process in FIG. 11 is performed. That is, the copy destination disk (in this example, the disk HS2) in the redundant copy is excluded from the totalization. Therefore, the totalization result when the process in FIG. 11 is performed is described as follows.

"used disk"='1', "unused disk"='1', and "loop-down disk"='1'

Therefore, in the above-mentioned two variations of blocking conditions,

"unused disk"='1', "loop-down disk"='1 or more' is satisfied. Therefore, it is determined that the RAID group is to be blocked (no erroneous determination).

Next, the reason for using the special example 2 is described below by referring to a practical example.

Figure 13C:
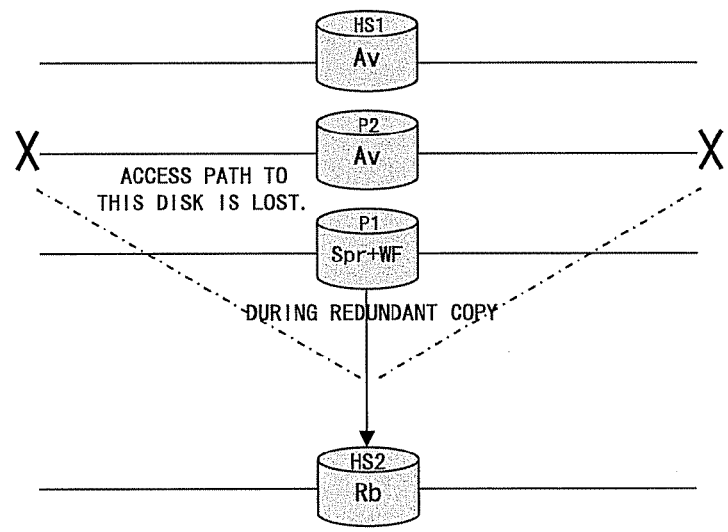

First, as explained above, as indicated on the right of FIG. 2, there is the status of "write failure" (SpW) for the redundant copy (sparing). This status is provided to improve the completion rate of the redundant copy. That is, as explained above in the Description of the Related Art, there can be a write failure at the copy source as a result of a write to all disks. In this case, the copying process can be continued without immediately determining a broken status. FIG. 13C shows an example of the status. In the example shown in FIG. 13C, the disks P2 and HS1 are in the Av status, and the redundant copy is performed using the disk P1 as a copy source and the disk HS2 as a copy destination, but a write fails on the disk P1. In this case, as shown in FIG. 13C, the status of the disk P1 is not defined as the Br status, but as the "Spr+WF" status, thereby continuing the copy. In this status, in the example shown in FIG. 13C, an access path to the disk P2 has been lost for any reason.

Since the disk P1 to which a write fails stores old data, the data cannot be read from the disk P1. In the case of RAID 5, at least two readable disks (in the Av status) have to be kept. In the status shown in FIG. 13C, old data is read unless blocking is performed, thereby possibly causing erroneous data.

However, when the process shown in FIG. 11 is performed on the status shown in FIG. 13C, the totalization result is obtained as follows.

"used disk"='2', "unused disk"='0', "loop-down disk"='1'

Therefore, since the result does not correspond to either of the two variations of the blocking conditions, no blocking is determined. In the process shown in FIG. 12, the disk P1 is counted not as a "used disk", but as an "unused disk". That is, the copy source disk of the redundant copy is processed as in the broken status, and the status of the RAID group is processed as a non-redundant status.

When the process shown in FIG. 11 is performed on the status shown in FIG. 13C, the totalization result is obtained as follows.

"used disk"='1', "unused disk"='1', and "loop-down disk"='1'

Therefore, since one of the two types of blocking conditions is satisfied, it is determined that the RAID group is to be blocked (appropriate determination is made).

When any RAID group is blocked by any process shown in FIGS. 9 through 12 and explained above, the technology described in the Description of the Related Art, or the existing technology, it is obvious that all access from the host device cannot be accepted. Therefore, the host device abnormally terminates the processes performed so far. There is no problem with a mission-critical system (a delay of access can give a worse influence on a system than an immediate stop). However, with the other systems (that prioritizes the recovery of the RAID apparatus with a prolonged response time on the host) taken into account, the following second embodiment for embodying the present invention is proposed. That is, a long time taken to restore a blocked RAID group can be accepted, but when the restoration can be performed in a short time, it is considered better not to inform the host of the blocking although the RAID group is actually blocked.

Therefore, in the second embodiment for embodying the present invention, a dummy response ("busy" in this case) is returned to host access when the recovery can be performed in a short time although the RAID group is actually blocked. When "busy" is returned, the host performs a retrial process at a short interval, an the process being performed is not abnormally terminated. The "busy" is also returned to the retrial process. Thus, the blocked RAID group is recovered (the recovery process is performed) while the host is repeating the retrial process. However, when the retrial process fails, the host repeatedly performs the retrial process, thereby badly influencing the system, and issuing a notification of the occurrence of RAID blocking.

There are the following cases where a recovery process can be performed for a short time.

(a) When a part is broken and an automatic recovery function is operated by a RAID apparatus (when a fault activating an automatic recovery function occurs simultaneously with a fault not activating the automatic recovery function, it is processed as a case where the recovery can be performed in a short time. Since the two systems gain access using two BRTs, the system can become available if only one system can be recovered by the automatic recovery function.)

(b) When a part is broken and other disks are "Spindown" by a faulty disk.

Regarding to (a) above, when, for example, the port of a BRT becomes faulty, or the CE (operator: human) forcibly invites a fault, etc., the automatic recovery function does not work. On the other hand, when the port of the BRT is broken, and when the RAID apparatus separates it as an abnormal condition (for example, when the PBC determines an abnormal disk and disconnects it), the automatic recovery function works.

Described below is a case where the PBC determines an abnormal disk and disconnects it. For example, when a plurality of disks A, B, and C are connected to any port of the BRT and form an FC loop, when a loop operates in the order of the disk A→the disk B→the disk C, and when the disk A becomes faulty and the loop is disconnected, there can be the case where it is determined that the port of the BRT has been broken although the disk A is actually faulty. In this case, if each disk is checked by the conventional checking function of the PBC, it is detected that the disk A is faulty, and the problem is solved by the PBC separating the disk A.

When the RAS notifies the RAID management/control unit 22 of the occurrence of a fault, it issues a notification by adding the information (factor) about which has determined the fault (in the example above, the operator or the apparatus). The RAID management/control unit 22 records the information (factor) in the configuration information 22a. The determination as to whether or not the automatic recovery function works can be performed by referring to the configuration information 22a, or when the factor is reflected by the configuration information 22a. This also holds true with (b) above. That is, not only a broken part but also a faulty disk is processed as a broken status, the factor is added and reflected by the configuration information 22a. Therefore, the factor is referred to and the above-mentioned determination is performed.

Figure 14:
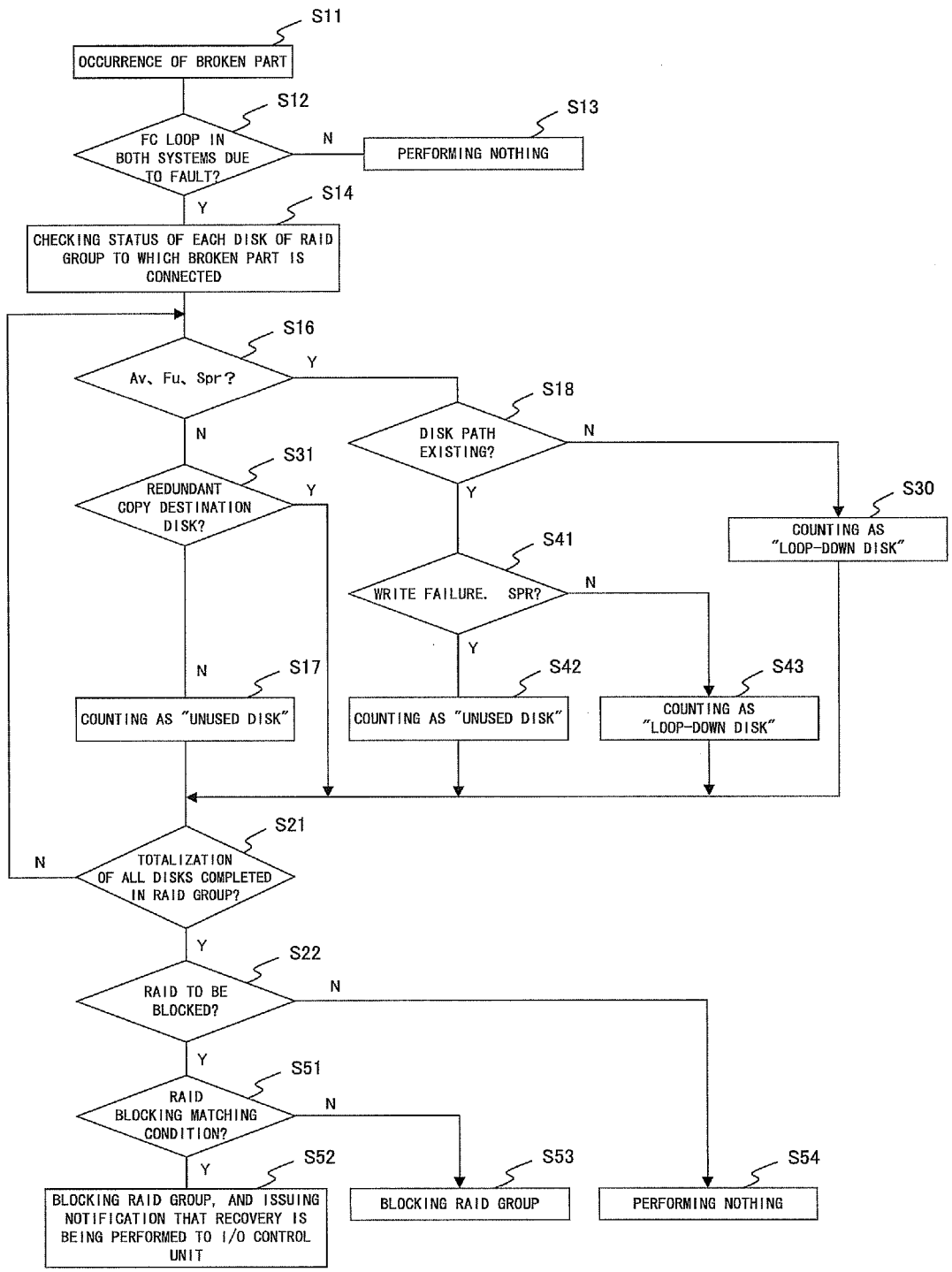
FIG. 14 is a flowchart (1) of the process according to the second embodiment of the present invention.

FIG. 14 is a flowchart of the process according to the second embodiment embodying the present invention based on the process shown in FIG. 12.

In FIG. 14, the process step that is the same as the process step shown in FIG. 12 is assigned the same step number, and the explanation is omitted here.

In the process shown in FIG. 12, when it is determined that the RAID is blocked in step S22 (YES in step S22), the process (of blocking the RAID) in step S23 is performed. In the process shown in FIG. 14, the process in step S23 is replaced with the processes in steps S51 through S53.

That is, when the determination in step S22 is YES, it is determined whether or not RAID blocking is caused by the broken part (a) or (b) (step S51). If it is caused by the broken part (a) or (b) (YES in step S51), the RAID group is blocked, and a notification that the recovery process is being performed is transmitted to the I/O control unit 21 (step S52). Upon receipt of the notification, the I/O control unit 21 returns a dummy response ("busy" in this example) to the host access.

On the other hand, when the blocking is not caused by the broken part (a) or (b) (NO in step S51), the normal RAID blocking process is performed as in the case shown in FIG. 12 (step S53).

Figure 15:
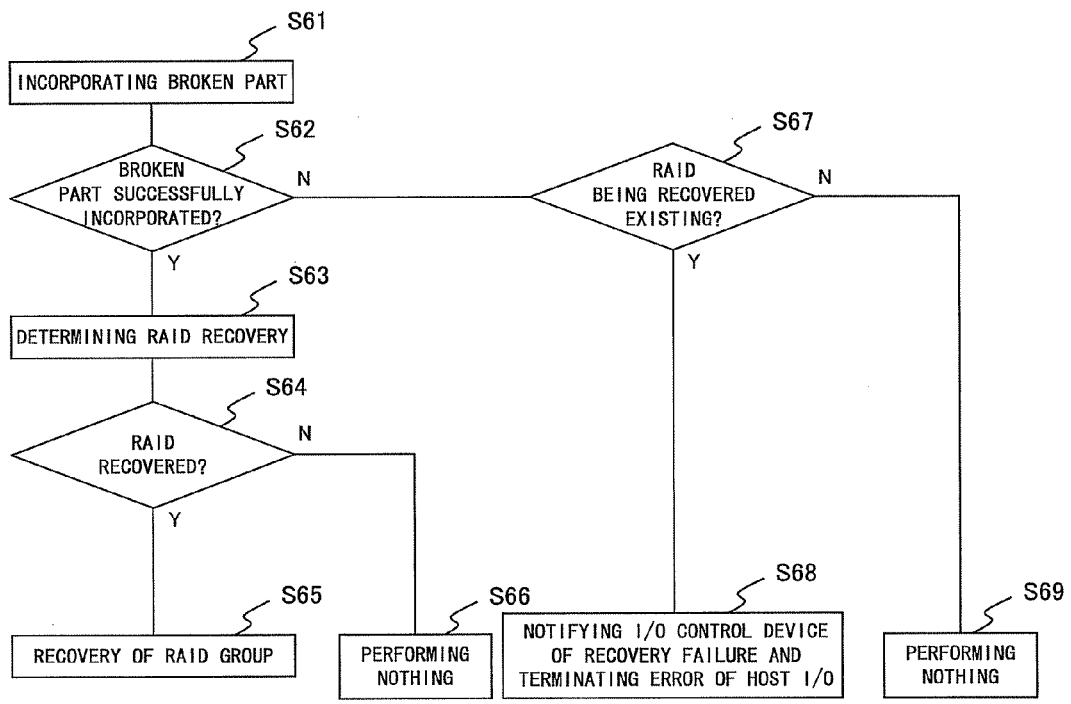
FIG. 15 is a flowchart (2) of the process according to the second embodiment of the present invention.

FIG. 15 is a flowchart of the process of performing the recovery from the RAID blocking.

In FIG. 15, the processes in steps S61 through S66 are the conventional processes. That is, the broken parts can be incorporated again into the system after exchanging the parts or performing the automatic recovery, etc. (step S61). If they can be successfully incorporated again (YES in step S62), the RAID recovery determining process is performed (step S63). When it is determined that the RAID can be recovered (YES in step S64), the RAID group is recovered (step S65). If it is determined that the RAID cannot be recovered (NO in step S64), no operation is performed.

If the parts are not successfully incorporated (NO in step S62), nothing is normally performed (step S69). However, when the process in step S52 is performed (YES in step S67), the host continues the retrial process, and it is necessary to notify the I/O control unit 21 of the unsuccessful recovery and terminate the erroneous host access (step S68).

As explained above, according to the second embodiment for embodying the present invention, the host is kept waiting for some time when the recovery process can be performed in a short time after the RAID blocking occurs, and the host access is permitted upon completion of the recovery of the RAID, thereby successfully resuming the access without abnormal termination of the host access. On the other hand, if the recovery of a RAID cannot be successfully performed, the host access is abnormally terminated, and the wasteful retrial process of the host is stopped.

According to the RAID blocking determining method, RAID apparatus, its controller module, program, etc., the possibility of the RAID blocking process can be determined, the laborious setting of the process can be largely reduced, the maintenance performance can be improved, the complexity of coding can be reduced, and a common determination logic can be used for each RAID level.

In addition, although RAID blocking occurs, the abnormal termination of the process so far performed on the host side can be avoided.

What is claimed is:

1. A controller module in a RAID apparatus having a RAID group constituted by a plurality of disks, comprising
a RAID management/control device classifying each disk each time a specific event on which possibility of RAID blocking is determined occurs in the RAID apparatus for each RAID group to be blocked based on a status of each disk belonging to the RAID group and presence/absence of an access path to each disk, totalizing a number of corresponding disks for each classification unit, comparing each totalizing result with a predetermined threshold condition, and determining whether or not the RAID group is to be blocked.

2. The controller module according to claim 1, wherein:
the plurality of categories are a "used disk", an "unused disk", and a "loop-down disk"; and
the threshold condition is set for each RAID level, and the determination is performed using a threshold condition depending on a RAID level of the RAID group to be processed.

3. The controller module according to claim 2, wherein
the "used disk" is an accessible disk, the "unused disk" is a disk not accessible due to a broken disk, and the "loop-down disk" is a disk not accessible due to a lost access path.

4. The controller module according to claim 2, wherein:
when the RAID level is RAID 0, the threshold condition is 0 for the "unused disk" and 1 or more for the "loop-down disk"; and
when the RAID group has a RAID level of RAID 0 and the totalization result of the group corresponds to the threshold condition, it is determined that the RAID group is to be blocked.

5. The controller module according to claim 2, wherein:
when the RAID level is RAID 1 or RAID 0+1, the threshold condition is 0 for the "used disk" and 1 or more for the "loop-down disk"; and
when the RAID group has a RAID level of RAID 1 or RAID 0+1 and the totalization result of the group corresponds to the threshold condition, it is determined that the RAID group is to be blocked.

6. The controller module according to claim 2, wherein:
when the RAID level is RAID 5 or RAID 0+5, the threshold condition is 0 for the "unused disk" and 2 or more for the "loop-down disk", or 1 for the "unused disk" and 1 or more for the "loop-down disk"; and
when the RAID group has a RAID level of RAID 5 or RAID 0+5 and the totalization result of the group corresponds to one of two threshold conditions, it is determined that the RAID group is to be blocked.

7. The controller module according to claim 2, wherein
a copy destination disk in redundant copy is excluded from the totalization.

8. The controller module according to claim 2, wherein
a disk in a sparing status but in "write failure" is not classified as the "used disk", but as the "unused disk".

9. A controller module in a RAID apparatus having a RAID group constituted by a plurality of disks, comprising:
an I/O control device as an interface between the controller module and any external host device; and
RAID management/control device managing and controlling determination of blocking possibility of the RAID group in the RAID apparatus and execution of blocking, wherein
when any RAID group is blocked, the RAID management/control device determines whether or not the RAID group can be recovered in a short time, and when it is determined that the recovery can be performed in a short time, the I/O control device is notified of the determination; and
when the I/O control device receives the notification and the host device requests to access the blocked RAID group, a dummy response is returned to the host device.

10. The controller module according to claim 9, wherein
the dummy response is "busy"; and
using the response of the "busy", the host device repeats a retrial process.

11. The controller module according to claim 9, wherein
a case where recovery can be performed in a short time refers to a case where a broken part activates an automatic recovery function by the RAID apparatus or any broken disk spins down another disk.

12. A RAID apparatus, comprising:
a RAID group comprising a plurality of disks: and
a controller module classifying each disk each time a specific event on which possibility of RAID blocking is determined occurs in the RAID apparatus for each RAID group to be blocked based on a status of each disk belonging to the RAID group and presence/absence of an access path to each disk, totalizing a number of corresponding disks for each classification unit, comparing each totalizing result with a predetermined threshold condition, and determining whether or not the RAID group is to be blocked.

* * * * *